US00RE35688E

United States Patent [19]

Gorecki

[11] E Patent Number: Re. 35,688

[45] Reissued Date of Patent: Dec. 16, 1997

[54] COMPOSITION AND METHOD FOR TREATMENT OF PHOSPHATED METAL SURFACES

[75] Inventor: George J. Gorecki, Niles, Ill.

[73] Assignee: Brent America, Inc., La Mirada, Calif.

[21] Appl. No.: 638,364

[22] Filed: Apr. 26, 1996

Related U.S. Patent Documents

Reissue of:

[64] Patent No.: 5,397,390
Issued: Mar. 14, 1995
Appl. No.: 197,245
Filed: Feb. 16, 1994

U.S. Applications:

[63] Continuation-in-part of Ser. No. 106,070, Aug. 13, 1993, abandoned.

[51] Int. Cl.[6] ..... C09K 3/00; B05D 3/02

[52] U.S. Cl. ..... 106/287.11; 106/14.12; 106/14.44; 106/287.11; 148/247; 427/327; 427/387; 427/388.1; 427/388.4; 427/409; 427/421; 427/435

[58] Field of Search ..... 106/14.12, 14.44, 106/287.11, 287.19; 148/247; 427/327, 387, 388.1, 388.4, 409, 421, 435

[56] References Cited

U.S. PATENT DOCUMENTS

| | | | |
|---|---|---|---|
| 3,695,942 | 10/1972 | Binns | 106/14.12 |
| 3,850,732 | 11/1974 | Binns | 106/14.12 |
| 4,339,310 | 7/1982 | Oda et al. | 205/199 |
| 4,457,790 | 7/1984 | Lindert et al. | 148/247 |
| 4,650,526 | 3/1987 | Claffey et al. | 148/259 |
| 4,900,362 | 2/1990 | Fujiki et al. | 106/287.19 |
| 5,053,081 | 10/1991 | Jacob | 106/287.11 |
| 5,167,706 | 12/1992 | Kuszaj | 106/287.11 |
| 5,192,364 | 3/1993 | Inoue et al. | 106/287.19 |
| 5,209,788 | 5/1993 | McMillen et al. | 148/247 |
| 5,221,371 | 6/1993 | Miller | 148/273 |
| 5,248,334 | 9/1993 | Fey | 106/287.11 |
| 5,324,545 | 6/1994 | Flamme | 427/406 |

FOREIGN PATENT DOCUMENTS

| | | | |
|---|---|---|---|
| 0032306 | 7/1981 | European Pat. Off. . | |
| 0153973 | 9/1985 | European Pat. Off. . | |
| 2487381 | 1/1982 | France . | |
| 56-125464 | 10/1981 | Japan | 106/287.11 |

OTHER PUBLICATIONS

CRC Handbook Of Chemistry and Physics, p. 145. (70th Edition) (1989) [No Month].

Advanced Inorganic Chemistry, A Comprehensive Text, p. 828 (4th Edition) [No Date].

PCT International Search Report (Nov. 1994).

PCT Written Opinion (May 1995).

English translation of EP 0153973 (Sep. 1985).

PCT International Search Report PCT/GB02805 (Mar. 1996).

*Primary Examiner*—Anthony Green

*Attorney, Agent, or Firm*—Pretty, Schroeder & Poplawski

[57] ABSTRACT

A rinse solution for the treatment of conversion-coated metal substrates for improving the adhesion and corrosion resistance of siccative coatings, comprising an aqueous solution of zirconium ion and an organosilane selected from the group consisting of [3-glycidoxypropyltrimethoxysilane,] methyltrimethoxysilane, [γ-methacryloxytrimethoxysilane,] phenyltrimethoxysilane, and mixtures thereof, with the zirconium ion concentration selected to provide a pH about 2.0 to 9.0. A method for treating such materials by applying the rinse solution to the substrate.

12 Claims, No Drawings

COMPOSITION AND METHOD FOR TREATMENT OF PHOSPHATED METAL SURFACES

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of copending application Ser. No. 08/106,070, filed Aug. 13, 1993.

BACKGROUND OF THE INVENTION

This invention relates to the treatment of metal surfaces prior to a finishing operation, such as the application of a siccative organic coating (also known as an "organic coating", "organic finish", or simply, "paint"). Specifically, this invention relates to the treatment of conversion-coated metal with an aqueous solution comprised of a selected organosilane and a zirconium ion. Treatment of conversion-coated metal with such a solution improves paint adhesion and corrosion resistance.

The primary purposes of applying siccative coatings to metal substrates (e.g., steel, aluminum, zinc and their alloys) are protection of the metal surface from corrosion and for aesthetic reasons. It is well-known, however, that many organic coatings adhere poorly to metals in their normal state. As a result, corrosion-resistance characteristics of the siccative coating are substantially diminished. It is therefore a typical procedure in the metal finishing industry to subject metals to a pre-treatment process whereby a conversion coating is formed on the metal surface. This conversion coating acts as a protective layer, slowing the onset of the degradation of the base metal, owing to the conversion coating being less soluble in a corrosive environment than is the base metal. The conversion coating is also effective by serving as a recipient for a subsequent siccative coating. The conversion coating has a greater surface area than does the base metal and thus provides for a greater number of adhesion sites for the interaction between the conversion coating and the organic finish. Typical examples of such conversion coatings include, but are not limited to, iron phosphate coatings, zinc phosphate coatings, and chromate conversion coatings. These conversion coatings and others are well-known in the art and will not be descried in any further detail.

Normally, the application of an organic finish to a conversion-coated metal surface is not sufficient to provide the highest levels of paint adhesion and corrosion resistance. Painted metal surfaces are able to reach maximum performance levels when the conversion-coated metal surface is treated with a "final rinse", also referred to in the art as a "post-rinse" or a "seal rinse", prior to the painting operation. Final rinses are typically aqueous solutions containing organic or inorganic entities designed to improve paint adhesion and corrosion resistance. The purpose of any final rinse, regardless of its composition, is to form a system with the conversion coating in order to maximize paint adhesion and corrosion resistance. This may be accomplished by altering the electrochemical state of the conversion-coated substrate by rendering it more passive or it may be accomplished by forming a barrier film which prevents a corrosive medium from reaching the metal surface. The most effective final rinses in general use today are aqueous solutions containing chromic acid, partially reduced to render a solution comprised of a combination of hexavalent and trivalent chromium. Final rinses of this type have long been known to provide the highest levels of paint adhesion and corrosion resistance. Chromium-containing final rinses, however, have a serious drawback due to their inherent toxicity and hazardous nature. These concerns make chromium-containing final rinses less desirable from a practical standpoint, when one considers such issues as safe handling of chemicals and the environmental problems associated with the discharge of such solutions into municipal water streams. Thus, it has been a goal of the industry to find chromium-free alternatives which are less toxic and more environmentally benign than chromium-containing final rinses. It has also been desirous to develop chromium-free final rinses which are as effective as chromium-containing final rinses in terms of paint adhesion and corrosion resistance properties.

Much work has already been done in the area of chromium-free final rinses. Some of these have utilized either zirconium chemistry or organosilanes. U.S. Pat. No. 3,695,942 describes a method of treating conversion-coated metal with an aqueous solution containing soluble zirconium compounds. U.S. Pat. No. 4,650,526 describes a method of treating phosphated metal surfaces with an aqueous mixture of an aluminum zirconium complex, an organofunctional ligand and a zirconium oxyhalide. The treated metal could be optionally rinsed with deionized water prior to painting. U.S. Pat. No. 5,053,081 describes a final rinse composition comprising an aqueous solution containing 3-aminopropyl triethoxysilane and a titanium chelate. In all of the above examples, the treatment method described claimed to improve paint adhesion and corrosion resistance.

The levels of paint adhesion and corrosion resistance afforded by the treatment solutions in the above examples do not reach the levels desired by the metal finishing industry, namely the performance characteristics of chromium-containing final rinses. I have found that aqueous solutions containing selected organosilane compounds and zirconium ion provide paint adhesion and corrosion resistance characteristics comparable to those attained with chromium-containing final rinses. In many cases, the performance of conversion-coated metal surfaces treated with organosilane-zirconium solutions in accelerated corrosion tests exceeds that of conversion-coated metal treated with chromium-containing solutions.

SUMMARY OF THE INVENTION

It is an object of this invention to provide a method and composition of an aqueous rinse which will impart an improved level of paint adhesion and corrosion resistance on painted conversion-coated metal. The composition is comprised of an aqueous solution containing a selected organosilane and zirconium ion and provides levels of paint adhesion and corrosion resistance comparable to or exceeding those provided by chromium-containing final rinses.

It is a further object of the invention to provide a method and rinse composition which contains no chromium.

The presently preferred embodiment of the invention includes a rinse solution for the treatment of conversion-coated metal substrates for improving the adhesion and corrosion resistance of siccative coatings, comprising an aqueous solution of zirconium ion and an organosilane selected from the group consisting of 3-glycidoxypropyltrimethoxysilane, methyltrimethoxysilane, [γ-methacryloxytrimethoxysilane,] phenyltrimethoxysilane, and mixtures thereof, with the zirconium ion concentration selected to provide a pH about 2.0 to 9.0.

The invention also includes a method for treating such materials by applying the rinse solution to the substrate.

DESCRIPTION OF THE PREFERRED EMBODIMENTS

The rinse solution of the invention is an aqueous solution containing a selected organosilane compound and zirconium ion. It is intended that the rinse solution be applied to conversion-coated metal. The formation of conversion coatings on metal substrates is well-known within the metal finishing industry. In general, this process is usually described as a process requiring several pretreatment stages. The actual number of stages is typically dependent on the final use of the painted metal article. The number of pretreatment steps normally varies anywhere from two to nine stages. A representative example of a pretreatment process involves a five-stage operation where the metal to be ultimately painted goes through a cleaning stage, a water rinse, a conversion coating stage, a water rinse and a final rinse stage. Modifications to the pretreatment process can be made according to specific needs. As an example, surfactants can be incorporated into some conversion coating baths so that cleaning and the formation of the conversion coating can be achieved simultaneously. In other cases it may be necessary to increase the number of pretreatment stages so as to accommodate more pretreatment steps. Examples of the types of conversion coatings that can be formed on metal substrates are iron phosphates and zinc phosphates. Iron phosphating is usually accomplished in no more than five pretreatment stages, while zinc phosphating usually requires a minimum of six pretreatment stages. The number of rinse stages between the actual pretreatment steps can be adjusted to insure that rinsing is complete and effective and so that the chemical pretreatment from one stage is not carried on the metal surface to subsequent stages, thereby possibly contaminating them. It is typical to increase the number of rinse stages when the metal parts to be treated have unusual geometries or areas that are difficult for the rinse water to contact. The method of application of the pretreatment operation can be either an immersion or a spray operation. In immersion operations, the metal articles are submersed in the various pretreatment baths for defined intervals before moving on to the next pretreatment stage. A spray operation is one where the pretreatment solutions and rinses are circulated by means of a pump through risers fashioned with spray nozzles. The metal articles to be treated normally proceed through the pretreatment operation by means of a continuous conveyor. Virtually all pretreatment processes can be modified to run in spray mode or immersion mode, and the choice is usually made based on the final requirements of the painted metal article. It is to be understood that the invention described here can be applied to any conversion-coated metal surface and can be applied either as a spray process or an immersion process.

The rinse solution of the invention is comprised of an aqueous solution of a selected organosilane and zirconium ion. Specifically, the rinse solution is an aqueous solution containing zirconium ion, whose source can be a zirconium salt, such as hexafluorozirconic acid, zirconium basic sulfate, zirconium hydroxychloride, zirconium basic carbonate, zirconium oxychloride, zirconium acetate, zirconium fluoride, zirconium hydroxide, zirconium orthosulfate, zirconium oxide, zirconium potassium carbonate and mixtures thereof; and any one of four organosilanes: 3-glycidoxypropyltrimethoxysilane, methyltrimethoxysilane, [γ-methacryloxytrimethoxysilane,] phenyltrimethoxysilane, and mixtures thereof.

The rinse solution is prepared by making an aqueous solution containing zirconium ion such that the pH of the resulting solution is in the range of about 2.0 to 9.0. When zirconium-containing salts such as zirconium basic sulfate, zirconium hydroxychloride, zirconium basic carbonate, zirconium oxychloride are used as the zirconium source, the salts must be dissolved in 50% hydrofluoric acid in order to effect dissolution. The rinse solution of the invention typically contains zirconium ion in the concentration range of at least about 0.005% w/w, i.e. percent by weight. There is no significant upper limit to the zirconium ion concentration. The pH of the zirconium solution, is measured; if the pH is outside the desired range, water or zirconium salt is added to change the pH to fall within the desired range. Hence the amount of zirconium ion present in the finished solution is a function of the pH. The concentration is not likely to exceed 1.0% w/w. A selected organosilane is added to the zirconium-containing solution described above in the concentration range of about 0.1 to 6% w/w. The solution is then mixed for at least 30 minutes to complete the hydrolysis of the selected organosilane, after which time the rinse solution is ready to be applied to conversion-coated metal. The addition of the silane does not affect the pH of the solution.

[A preferred version of the invention is an aqueous solution containing 0.005 to 0.1% w/w zirconium ion and 0.1 to 4% w/w of γ-methacryloxytrimethoxysilane. The resulting solution can be effectively operated at pH 2.0 to 7.0.]

Another preferred version of the invention is an aqueous solution containing 0.005 to 0.1% w/w zirconium ion and 0.1 to 4% w/w 3-glycidoxypropyltrimethoxysilane, with the resulting solution being effectively operated at pH 2.0 to 7.0.

Another preferred version of the invention is an aqueous solution containing 0.005 to 0.1% w/w zirconium ion and 0.1 to 2% w/w phenyltrimethoxysilane, with the resulting solution being effectively operated at pH 2.0 to 6.0.

An especially preferred version of the invention is an aqueous solution containing 0.005 to 0.1% w/w zirconium ion and 0.25 to 6% w/w methyltrimethoxysilane, with the resulting solution being effectively operated at pH 2.5 to 8.8.

[Another especially preferred version of the invention is an aqueous solution containing 0.005 to 0. 1% w/w zirconium ion and 0.25 to 1% w/w γ-methacryloxytrimethoxysilane, with the resulting solution being effectively operated at pH 2.5 to 4.0.]

Another especially preferred version of the invention is an aqueous solution containing 0.005 to 0.1% w/w zirconium ion and 0.5 to 2% w/w 3-glycidoxypropyltrimethoxysilane, with the resulting solution being effectively operated at pH 2.8 to 6.0.

Another especially preferred version of the invention is an aqueous solution containing 0.005 to 0.1% w/w zirconium ion and 0.1 to 0.5% w/w phenyltrimethoxysilane, with the resulting solution being effectively operated at pH 2.0 to 6.0.

The rinse solution of the invention can be applied by various means, so long as contact between the rinse solution and the conversion-coated substrate is effected. The preferred methods of application of the rinse solution of the invention are by immersion or by spray. In an immersion operation, the conversion-coated metal article is submersed in the rinse solution of the invention for a time interval from about 15 sec to 3 min, preferably 45 sec to 1 min. In a spray operation, the conversion-coated metal article comes in contact with the rinse solution of the invention by means of pumping the rinse solution through risers fashioned with spray nozzles. The application interval for the spray operation is about 15 sec to 3 min, preferably 45 sec to 1 min. The rinse solution of the invention can be applied at temperatures from about 40° F. to 180° F., preferably 60° F. to 90° F. The conversion-coated metal article treated with the rinse solution of the invention can be dried by various means, preferably oven drying at about 270° F. for about 5 min. The conversion-coated metal article, now treated with the rinse solution of the invention, is ready for application of the siccative coating.

EXAMPLES

The following examples demonstrate the utility of the rinse solution of the invention. Comparative examples include conversion-coated metal substrates treated with a chromium-containing rinse and conversion-coated metal substrates treated with an organosilane-organotitanate final rinse solution as described in U.S. Pat. No. 5,053,081, specifically 3-glycidoxypropyltrimethoxysilane at 0.35% w/w, TYZOR® CLA at 0.5% w/w. The TYZOR® CLA is used to promote adhesion. Throughout the examples, specific parameters for the pretreatment process, for the rinse solution of the invention, for the comparative rinses and the nature of the substrate and the type of siccative coating are described.

All treated and painted metal samples were subjected to accelerated corrosion testing. In general, the testing was performed according to the guidelines specified in ASTM B-117-85. Specifically, three identical specimens were prepared for each pretreatment system. The painted metal samples received a single, diagonal scribe which broke through the organic finish and penetrated to bare metal. All unpainted edges were covered with electrical tape. The specimens remained in the salt spray cabinet for an interval that was commensurate with the type of siccative coating that was being tested. Once removed from the salt spray cabinet, the metal samples were rinsed with tap water, dried by blotting with paper towels and evaluated. The evaluation was performed by scraping away the loose paint and corrosion products from the scribe area with the flat end of a spatula. The scraping was performed in such a manner so as only to remove loose paint and leave adhering paint intact. In the case of some organic finishes, like powder coating, removal of the loose paint and corrosion products from the scribe was accomplished by means of a tape pull as specified in ASTM B-117-85. Once the loose paint was removed, the scribe areas on the specimens were then measured to determine the amount of paint lost due to corrosion creepage. Each scribe line was measured at eight intervals, approximately 1 mm apart, measured across the entire width of the scribe area. The eight values were averaged for each specimen and the averages of the three identical specimens were averaged to arrive at the final result. The creepage values reported in the following tables reflect these final results.

Example 1

Cold-rolled steel test panels from Advanced Coating Technologies, Hillsdale, Michigan were processed through a five-stage pretreatment operation. The panels were cleaned with Ardrox, Inc. Chem Clean 1303, a commercially available alkaline cleaning compound. Once rendered water-break-free, the test panels were rinsed in tap water and phosphated with Ardrox, Inc. Chem Cote 3011, a commercially available iron phosphate. The phosphating bath was operated at about 6.2 points, 140° F., 3 min contact time, pH 4.8. After phosphating, the panels were rinsed in tap water and treated with various final rinse solutions for 1 min. The comparative chromium-containing rinse was Ardrox, Inc. Chem Seal 3603, a commercially available product. This bath was run at 0.25% w/w. In accordance with normal practice in the metal finishing industry, panels treated with the chromium-containing final rinse (1) were rinsed with deionized water prior to dry-off. The comparative chromium-free final rinse (2) contained 0.35% w/w 3-glycidoxypropyltrimethoxysilane and 0.5% w/w TYZOR.® CLA. All panels were then dried in an oven at 270° F. for 5 min. The panels were painted with a high-solids alkyd organic finish, an acrylic urethane and a melamine-polyester- The various rinses studied are summarized as follows.

1. Chem Seal 3603, Chromium-containing final rinse.
2. Comparative chromium-free final rinse.

[3. γmethacryloxytrimethoxysilane, 0.25% w/w, pH 2.94, Zr concentration, 0.075% w/w.

4. γ-methacryloxytrimethoxysilane, 0.5% w/w, pH 2.98, Zr concentration, 0.33% w/w.
5. γ-methacryloxytrimethoxysilane, 0.5% w/w, pH 3.94, Zr concentration, 0.33% w/w.
6. γ-methacryloxytrimethoxysilane, 1% w/w, pH 3.37, Zr concentration, 0.080% w/w.
7. γ-methacryloxytrimethoxysilane, 2% w/w, pH 2.05, Zr concentration, 0.090% w/w.]

The salt spray results are described in Table I. The values represent total creepage about the scribe area in mm. The numbers in parentheses represent the exposure interval for that particular organic finish.

Example 2

Another set of cold-rolled steel test panels was prepared using the parameters described in Example 1. The conversion-coated test panels were painted with the three organic finishes that were used in Example 1. The various final rinses are summarized as follows.

1. Chem Seal 3603, chromium-containing final rinse.
2. Comparative chromium-free final rinse.
8. 3-glycidoxypropyltrimethoxysilane, 0.25% w/w, pH 3.10, Zr concentration, 0.060% w/w.
9. 3-glycidoxypropyltrimethoxysilane, 0.5% w/w, pH 2.81, Zr concentration, 0.075% w/w.
10. 3-glycidoxypropyltrimethoxysilane, 1% w/w, pH 3.68, Zr concentration, 0.065% w/w.
11. 3-glycidoxypropyltrimethoxysilane, 1% w/w, pH 5.41, Zr concentration, 0.075% w/w.
12. 3-glycidoxypropyltrimethoxysilane, 2% w/w, pH 3.55, Zr concentration, 0.060% w/w.
13. 3-glycidoxypropyltrimethoxysilane, 2% w/w, pH 5.56, Zr concentration, 0.060% w/w.

The salt spray results are described in Table II. The values represent total creepage about the scribe area in mm. The numbers in parentheses represent the exposure interval for that particular organic finish.

Example 3

Another set of cold-rolled steel test panels was prepared using the parameters described in Example 1. The conversion-coated test panels were painted with the three organic finishes that were used in Example 1. The various final rinses are summarized as follows.

1. Chem Seal 3603, chromium-containing final rinse.
2. Comparative chromium-free final rinse.
14. methyltrimethoxysilane, 0.5% w/w, pH 2.96, Zr concentration, 0.075% w/w.
15. methyltrimethoxysilane, 0.5% w/w, pH 4.39, Zr concentration, 0.075% w/w.

16. methyltrimethoxysilane, 0.5% w/w, pH 5.37, Zr concentration, 0.075% w/w.
17. methyltrimethoxysilane, 1% w/w, pH 2.95, Zr concentration, 0.060% w/w.
18. methyltrimethoxysilane, 1% w/w, pH 4.84, Zr concentration, 0.060% w/w.
19. methyltrimethoxysilane, 2% w/w, pH 2.83, Zr concentration, 0.080% w/w.
20. methyltrimethoxysilane, 4% w/w, pH 5.25, Zr concentration, 0.085% w/w.
21. methyltrimethoxysilane, 4% w/w, pH 8.17, Zr concentration, 0.080% w/w.
22. methyltrimethoxysilane, 6% w/w, pH 4.05, Zr concentration, 0.068% w/w.

The salt spray results are described in Table III. The values represent total creepage about the scribe area in mm. The numbers in parentheses represent the exposure interval for that particular organic finish.

Example 4

Another set of cold-rolled steel test panels was prepared using the parameters described in Example 1. The conversion-coated test panels were painted with an epoxy organic finish, a baking enamel, a high-solid polyester, a melamine-polyester, and a red oxide primer/polyester topcoat system. The various final rinses are summarized as follows.

1. Chem Seal 3603, chromium-containing final rinse.
[23. γ-methacryloxytrimethoxysilane, 0.5% w/w, pH 4.0, Zr concentration, 0.15% w/w.]
24. 3-glycidoxypropyltrimethoxysilane, 0.5% w/w, pH 4.0, Zr concentration, 0.25% w/w.
25. methyltrimethoxysilane, 0.5% w/w, pH 4.0, Zr concentration, 0.10% w/w.

The salt spray results are described in Table IV. The values represent total creepage about the scribe area in mm. The numbers in parentheses represent the exposure interval for that particular organic finish.

Example 5

Another set of cold-rolled steel test panels was prepared using the parameters described in Example 1. The conversion-coated test panels were painted with an epoxy organic finish, an acrylic urethane, a melamine-polyester, a baking enamel, and a high-solids polyester. The various final rinses are summarized as follows.

1. Chem Seal 3603, chromium-containing final rinse.
24. 3-glycidoxypropyltrimethoxysilane, 0.5% w/w, pH 4.0, Zr concentration, 0.090% w/w.
25. methyltrimethoxysilane, 0.5% w/w, pH 4.0, Zr concentration, 0.045% w/w.

The salt spray results are described in Table V. The values represent total creepage about the scribe area in mm. The numbers in parentheses represent the exposure interval for that particular organic finish.

Example 6

Another set of cold-rolled steel test panels was prepared using the parameters described in Example 1. The conversion-coated test panels were painted with a baking enamel, a high-solids polyester, an alkyd epoxy melamine, an acrylic topcoat, and a red oxide primer/polyester topcoat system. The various final rinses are summarized as follows.

1. Chem Seal 3603, chromium-containing final rinse.
25. methyltrimethoxysilane, 0.5% w/w, pH 4.0, Zr concentration, 0.040% w/w.
26. methyltrimethoxysilane, 0.25% w/w, pH 4.0, Zr concentration, 0.040% w/w.

The salt spray results are described in Table VI. The values represent total creepage about the scribe area in mm. The numbers in parentheses represent the exposure interval for that particular organic finish.

Example 7

A set of cold-rolled steel test panels was prepared in a five-stage spray operation. The panels were cleaned with Ardrox, Inc. Chem Clean 1303, a commercially available alkaline cleaning compound. Once rendered water-break-free, the test panels were rinsed in tap water and phosphated with Ardrox, Inc. Chem Cote 3026, a commercially available iron phosphate. The phosphating bath was operated at about 9.0 points, 120° F. 1 min contact time, pH 4.5. After phosphating, the panels were rinsed in tap water and treated with various final rinse solutions for 1 min. The comparative chromium-containing rinse was Ardrox, Inc. Chem Seal 3603, a commercially available product. This bath was run at 0.25% v/v. The comparative chromium-free rinse (27) was Ardrox, Inc. Chem Seal 3610, operated at 0.25% v/v, pH 4.5. The conversion-coated test panels were painted with a urethane powder coating, an epoxy powder coating, an alkyd polyester urethane coating, and a melamine polyester coating.

1. Chem Seal 3603, chromium-containing final rinse.
27. Chem Seal 3610, comparative chromium-free final rinse.
28. methyltrimethoxysilane, 0.25% w/w, pH 4.6, Zr concentration, 0.55% w/w.
29. methyltrimethoxysilane, 0.5% w/w, pH 4.5, Zr concentration, 0.55% w/w.

The salt spray results are described in Table VII. The values represent total creepage about the scribe area in mm. The numbers in parentheses represent the exposure interval for that particular organic finish.

Example 8

Another set of cold-rolled steel test panels was prepared using the parameters described in Example 1. The conversion-coated test panels were painted with the three organic finishes that were used in Example 1. The various final rinses are summarized as follows.

1. Chem Seal 3603, chromium-containing final rinse.
30. phenyltrimethoxysilane, 0.1% w/w, pH 4.32, Zr concentration, 0.14% w/w.
31. phenyltrimethoxysilane, 0.25% w/w, pH 4.96, Zr concentration, 0.06% w/w.
32. phenyltrimethoxysilane, 0.25% w/w, pH 2.36, Zr concentration, 0.26% w/w.
33. phenyltrimethoxysilane, 0.5% w/w, pH 2.87, Zr concentration, 0.11% w/w.
34. phenyltrimethoxysilane, 0.5% w/w, pH 5.52, Zr concentration, 0.11% w/w.
35. phenyltrimethoxysilane, 1.0% w/w, pH 3.12, Zr concentration, 0.08% w/w.
36. phenyltrimethoxysilane, 2.0% w/w, pH 3.56, Zr concentration, 0.075% w/w.

The results from accelerated corrosion testing demonstrated in Examples 1 to 8 show that rinse solutions containing a selected organosilane and zirconium ion provided substantially better performance than either of the comparative chromium-free rinses, Rinses No. 2 and No. 26. The results demonstrated in Examples 1 to 8 also show that rinse solutions containing a selected organosilane and zirconium ion provided, in many cases, corrosion resistance comparable to that of a chromium-containing rinse, such as Final Rinse No. 1. In several instances, rinse solutions containing a selected organosilane and zirconium ion provided significantly higher levels of corrosion resistance than that achieved with a chromium-containing rinse.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

TABLE I

| Final Rinse No. | Alkyd (168 hr) | Urethane (216 hr) | Polyester (240 hr) |
|---|---|---|---|
| 1 | 3.6 mm | 1.8 mm | 3.3 mm |
| 2 | 32.3 | 22.2 | 40.0 |
| [3 | 2.5 | 2.0 | 4.6 |
| 4 | 2.2 | 8.9 | 3.2 |
| 5 | 2.3 | 10.8 | 3.2 |
| 6 | 1.7 | 7.4 | 3.0 |
| 7 | 2.6 | 5.4 | 3.4] |

TABLE II

| Final Rinse No. | Alkyd (168 hr) | Urethane (216 hr) | Polyester (240 hr) |
|---|---|---|---|
| 1 | 2.3 mm | 1.8 mm | 2.1 mm |
| 2 | 36.3 | 23.2 | 40.0 |
| 8 | 0.9 | 1.9 | 2.2 |
| 9 | 1.2 | 1.1 | 1.1 |
| 10 | 1.2 | 1.8 | 1.2 |
| 11 | 1.8 | 2.3 | 2.3 |
| 12 | 1.3 | 2.6 | 1.6 |
| 13 | 1.6 | 2.4 | 2.3 |

TABLE III

| Final Rinse No. | Alkyd (168 hr) | Urethane (216 hr) | Polyester (240 hr) |
|---|---|---|---|
| 1 | 2.3 mm | 1.8 mm | 2.1 mm |
| 2 | 36.3 | 23.2 | 40.0 |
| 14 | 1.5 | 2.0 | 1.1 |
| 15 | 0.9 | 1.8 | 1.2 |
| 16 | 1.5 | 3.8 | 1.6 |
| 17 | 0.8 | 2.0 | 0.9 |
| 18 | 1.1 | 5.5 | 1.3 |
| 19 | 1.0 | 3.9 | 1.2 |
| 20 | 0.5 | 10.9 | 0.8 |
| 21 | 0.3 | 11.6 | 1.0 |
| 22 | 2.6 | 2.6 | 1.7 |

TABLE IV

| Final Rinse No. | Epoxy (504 hr) | Enamel (168 hr) | High-Solid Polyester (243 hr) | Melamine-Polyester (216 hr) | Primer-Topcoat (262 hr) |
|---|---|---|---|---|---|
| 1 | 1.3 mm | 3.8 mm | 1.5 mm | 2.2 mm | 2.6 mm |
| [23 | 1.1 | 0.9 | 1.9 | 1.7 | 1.9] |
| 24 | 1.4 | 0.5 | 1.1 | 0.7 | 5.8 |
| 25 | 1.4 | 0.3 | 0.6 | 0.4 | 1.6 |

TABLE V

| Final Rinse No. | Epoxy (502 hr) | Acrylic Urethane (191 hr) | High-Solid Polyester (169 hr) | Melamine-Polyester (262 hr) | Baking Enamel (214 hr) |
|---|---|---|---|---|---|
| 1 | 2.2 mm | 2.8 mm | 5.4 mm | 3.1 mm | 3.1 mm |
| 24 | 2.0 | 1.8 | 0.5 | 0.8 | 1.3 |
| 25 | 1.6 | 1.6 | 1.1 | 1.1 | 1.1 |

TABLE VI

| Final Rinse No. | Alkyd Epoxy Melamine (607 hr) | Enamel (266 hr) | High-Solid Polyester (170 hr) | Acrylic (216 hr) | Primer-Topcoat (266 hr) |
|---|---|---|---|---|---|
| 1 | 2.0 mm | 13.4 mm | 4.7 mm | 3.4 mm | 4.6 mm |
| 25 | 1.2 | 0.8 | 0.6 | 1.9 | 1.5 |
| 26 | 1.4 | 0.7 | 1.0 | 3.8 | 2.9 |

TABLE VII

| Final Rinse No. | Urethane Powder (502 hr) | Epoxy Powder (672 hr) | Alkyd Polyester Urethane (168 hr) | Melamine Polyester (264 hr) |
|---|---|---|---|---|
| 1 | 0.9 mm | 1.7 mm | 5.6 mm | 5.0 mm |
| 27 | 4.1 | N/A* | N/A | 24.1 |
| 28 | 0.9 | N/A | N/A | N/A |
| 29 | 0.9 | 1.6 | 4.4 | 4.2 |

*Data not available.

TABLE VIII

| Final Rinse No. | Alkyd (168 hr) | Urethane (240 hr) | Polyester (240 hr) |
|---|---|---|---|
| 1 | 2.8 mm | 1.6 mm | 2.4 mm |
| 30 | 2.7 | 1.1 | 1.9 |
| 31 | 2.3 | 1.0 | 1.3 |
| 32 | 2.5 | 2.0 | 2.6 |
| 33 | 2.3 | 1.5 | 1.9 |
| 34 | 2.7 | 1.0 | 1.5 |
| 35 | 3.5 | 0.9 | 1.5 |
| 36 | 3.2 | 0.6 | 2.3 |

I claim:

1. A rinse solution for the treatment of conversion-coated metal substrates for improving the adhesion and corrosion resistance of siccative coatings, comprising an aqueous solution of zirconium ion and an organosilane in a concentration of about 0.1 to 6.0% w/w and selected from the group consisting of [3-glycidoxypropyltrimethoxysilane,] methyltrimethoxysilane, [γ-methacryloxytrimethoxysilane,] phenyltrimethoxysilane, and mixtures thereof, with the zirconium ion concentration selected to provide a pH for the entire solution about 2.0 to 9.0.

[2. A rinse solution as defined in claim 1 wherein the zirconium ion concentration in the rinse solution is at least about 0.005% w/w and the organosilane is about 0.1 to 4.0% w/w γ-methacryloxytrimethoxysilane.]

[3. A rinse solution as defined in claim 1 wherein the zirconium ion concentration in the rinse solution is at least about 0.005% w/w and the organosilane is about 0.25 to 1.0% w/w γ-methacryloxytrimethoxysilane, with a pH about 2.5 to 4.0.]

[4. A rinse solution as defined in claim 1 wherein the zirconium ion concentration in the rinse solution is at least about 0.005% w/w and the organosilane is about 0.1 to 6.0% w/w 3-glycidoxypropyltrimethoxysilane.]

[5. A rinse solution as defined in claim 1 wherein the zirconium ion concentration in the rinse solution is at least about 0.005% w/w and the organosilane is about 0.5 to 2.0% w/w 3-glycidoxypropyltrimethoxysilane, with a pH about 2.8 to 6.0.]

6. A rinse solution as defined in claim 1 wherein the zirconium ion concentration in the rinse solution is at least about 0.005% w/w and the organosilane is about 0.25 to 6.0% w/w methyltrimethoxysilane, with a pH about 2.5 to 8.8.

7. A rinse solution as defined in claim 1 wherein the zirconium ion is from a zirconium ion source selected from the group consisting of hexafluorozirconic acid, zirconium basic sulfate, zirconium hydroxychloride, zirconium basic carbonate, zirconium oxychloride, zirconium acetate, zirconium fluoride, zirconium hydroxide, zirconium orthosulfate, zirconium oxide, zirconium potassium carbonate and mixtures thereof.

8. A rinse solution as defined in claim 1 wherein the zirconium ion concentration is at least about 0.005% w/w.

9. A rinse solution as defined in claim 1 wherein the zirconium ion concentration in the rinse solution is at least about 0.005% w/w and the organosilane is about 0.1 to 2.0% w/w phenyltrimethoxysilane, with a pH about 2.0 to 6.0.

10. A rinse solution as defined in claim 1 wherein the zirconium ion concentration in the rinse solution is at least about 0.005% w/w and the organosilane is about 0.1 to 0.5% w/w phenyltrimethoxysilane, with a pH about 2.0 to 6.0.

11. In a method for treating conversion-coated metal substrates for improving the adhesion and corrosion resistance of siccative coatings, wherein the improvement comprises:

providing an aqueous solution of zirconium ion and an organosilane in a concentration of about 0.1 to 6.0% w/w and selected from the group consisting of [3-glycidoxypropyltrimethoxysilane,] methyltrimethoxysilane, [γ-methacryloxytrimethoxysilane,]phenyltrimethoxysilane, and mixtures thereof;

selecting the zirconium ion concentration to provide a pH of the solution of about 2.0 to 9.0; and applying the solution to the substrate.

[12. The method as defined in claim 11 wherein the zirconium ion concentration in the solution is at least about 0.005% w/w and the organosilane concentration in the solution is about 0.1 to 4.0% w/w γ-methacryloxytrimethoxysilane.]

[13. The method as defined in claim 11 wherein the zirconium ion concentration in the solution is at least about 0.005% w/w and the organosilane concentration in the solution is about 0.25 to 1.0% w/w γ-methacryloxytrimethoxysilane, with a pH about 2.5 to 4.0.]

[14. The method as defined in claim 11 wherein the zirconium ion concentration in the solution is at least about 0.005% w/w and the organosilane concentration in the solution is about 0.1 to 6.0% w/w 3-glycidoxypropyltrimethoxysilane.]

[15. The method as defined in claim 11 wherein the zirconium ion concentration in the solution is at least about 0.005% w/w and the organosilane concentration in the solution is about 0.5 to 2.0% w/w 3-glycidoxypropyltrimethoxysilane, with a pH about 2.8 to 6.0.]

16. The method as defined in claim 11 wherein the zirconium ion concentration in the solution is at least about 0.005% w/w and the organosilane concentration in the solution is about 0.25 to 6.0% w/w methyltrimethoxysilane, with a pH about 2.5 to 8.8.

17. The method as defined in claim 11 wherein the zirconium ion is from a zirconium ion source selected from the group consisting of hexafluorozirconic acid, zirconium basic sulfate, zirconium hydroxychloride, zirconium basic carbonate, zirconium oxychloride, zirconium acetate, zirconium fluoride, zirconium hydroxide, zirconium orthosulfate, zirconium oxide, zirconium potassium carbonate and mixtures thereof.

18. The method as defined in claim 11 wherein the zirconium ion concentration is at least about 0.005% w/w.

19. The method as defined in claim 11 wherein the zirconium ion concentration in the solution is at least about 0.005% w/w and the organosilane concentration in the solution is about 0.1 to 2.0% w/w phenyltrimethoxysilane, with a pH about 2.0 to 6.0.

20. The method as defined in claim 11 wherein the zirconium ion concentration in the solution is at least about 0.005% w/w and the organosilane concentration in the solution is about 0.1 to 0.5% w/w phenyltrimethoxysilane, with a pH about 2.0 to 6.0.

* * * * *